April 12, 1927.
E. E. SHIPLEY
1,624,284
WINDOW CLEANING DEVICE
Filed April 30, 1925   3 Sheets-Sheet 1
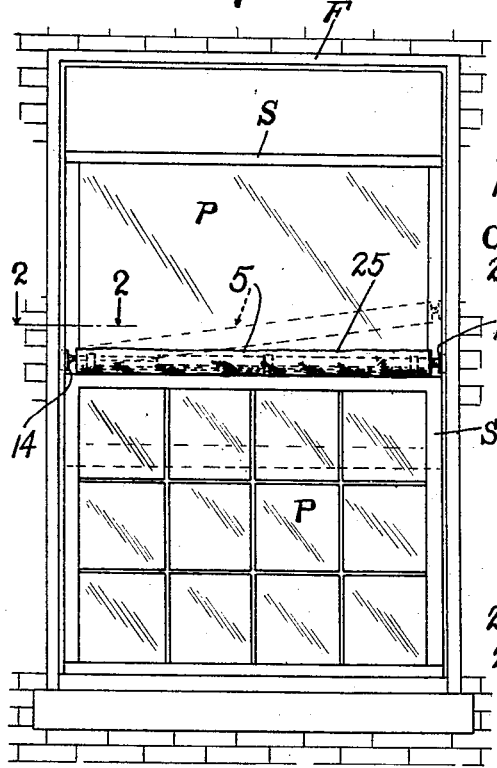
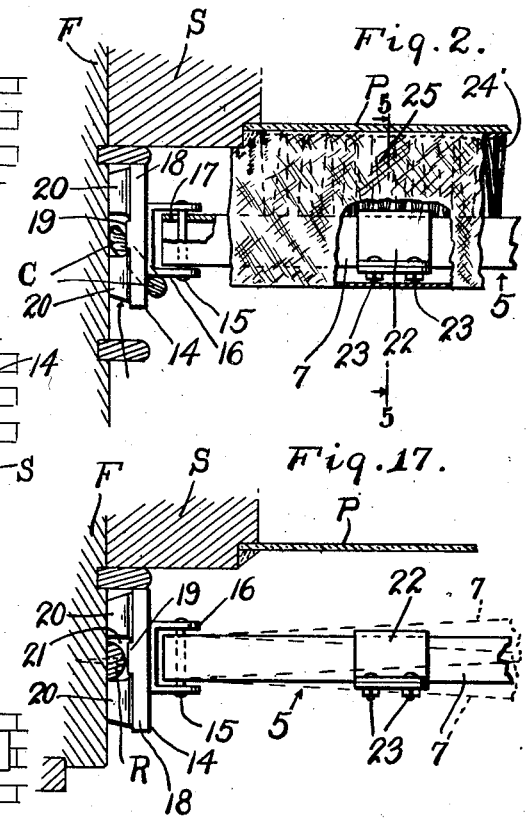
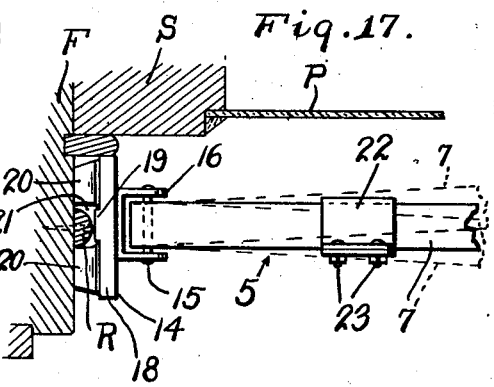
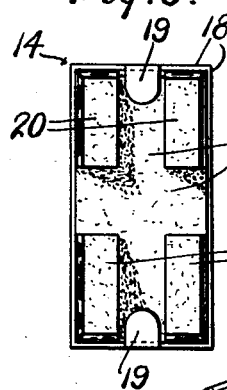
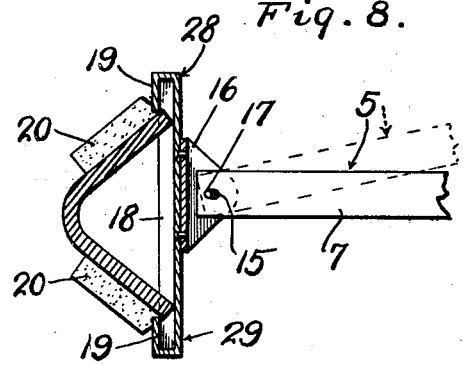
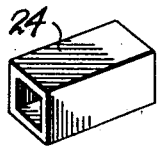
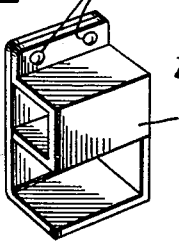
Inventor
Elmer E. Shipley
By L. B. James
Attorney April 12, 1927.
E. E. SHIPLEY
WINDOW CLEANING DEVICE
Filed April 30, 1925    3 Sheets-Sheet 2
1,624,284
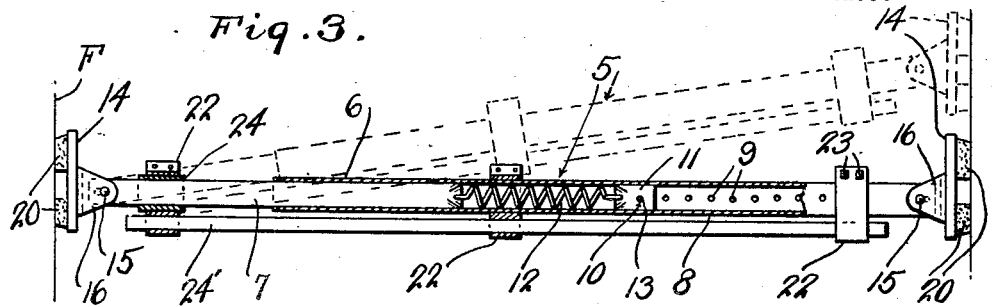
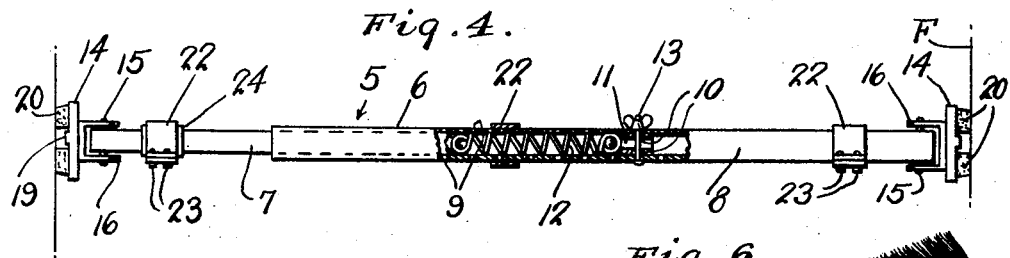
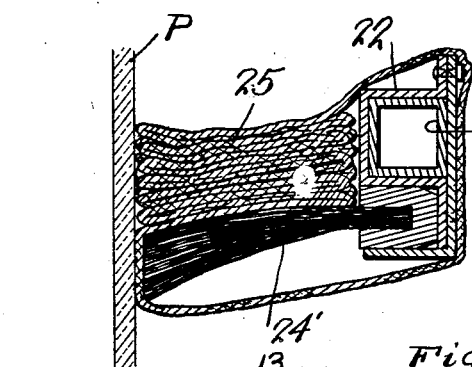
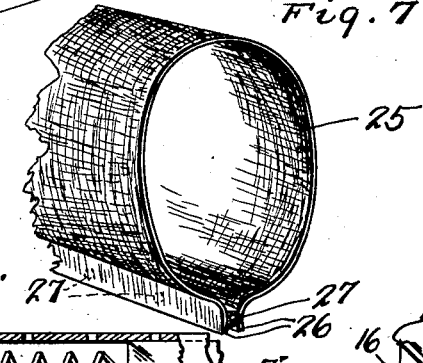
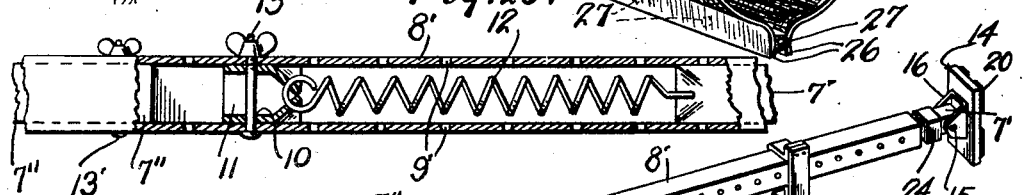
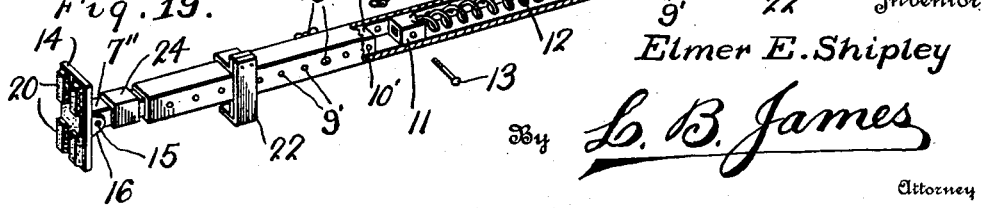
Inventor
Elmer E. Shipley
By L. B. James
Attorney

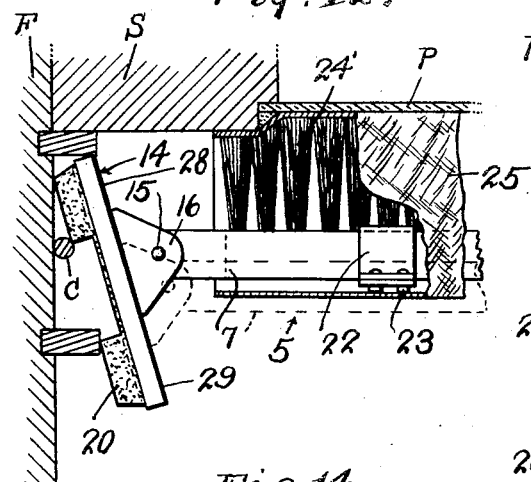
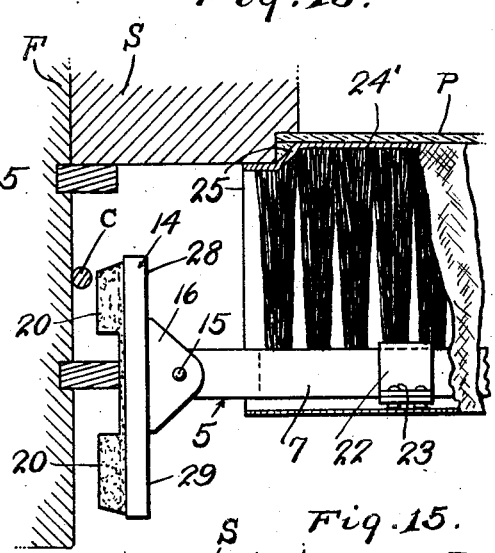
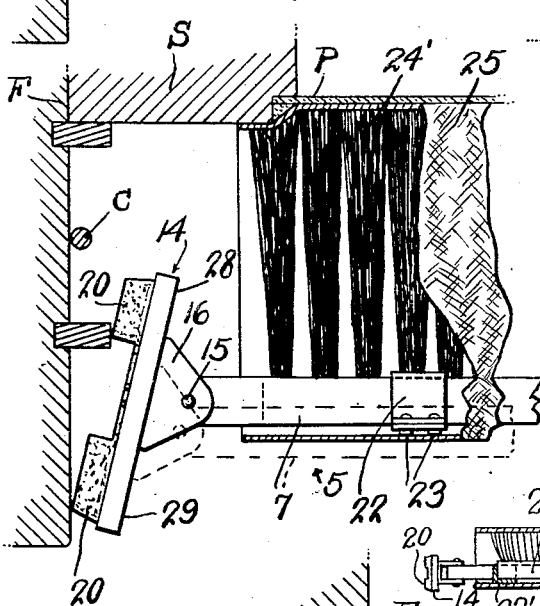
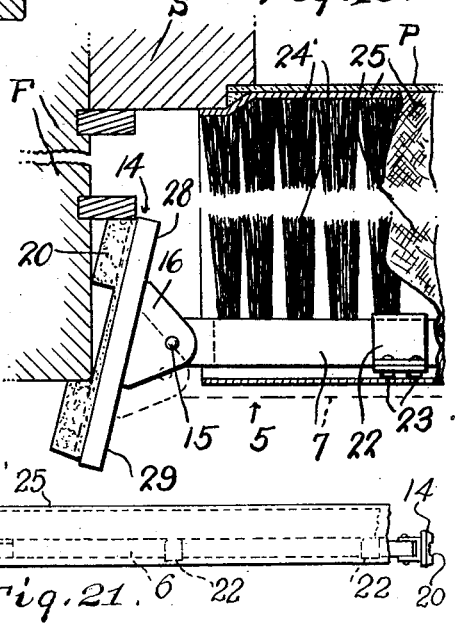
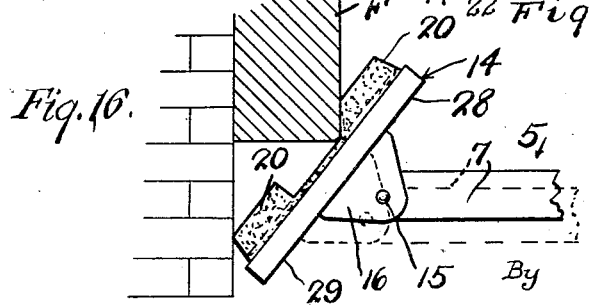

Patented Apr. 12, 1927.

1,624,284

UNITED STATES PATENT OFFICE.

ELMER E. SHIPLEY, OF WASHINGTON, DISTRICT OF COLUMBIA.

WINDOW-CLEANING DEVICE.

Application filed April 30, 1925. Serial No. 26,922.

This invention relates to window cleaning devices and more particularly to improvements of the invention forming the subject matter of my pending application, filed September 29, 1924, Serial No. 740,556.

The primary object of this invention resides in providing a window cleaning device adapted to be adjusted to fit windows of various widths and of any type of construction.

Another object of this invention resides in the provision of a window cleaning device of such construction that the same will procure a rigid grip on the window frame regardless of whether it is true or out of alignment.

Another object of this invention resides in the provision of a window cleaning device adapted to be adjusted or disposed in operative relation to the glass panels or panes of windows, under various pressures.

A further object of this invention resides in the provision of a window cleaning device adapted to carry window cleaning or contacting elements of various widths.

A still further object of this invention resides in the provision of a window cleaning device having feet which are adapted to engage the frames of windows in various positions to dispose the window engaging element into contact with the glass panels thereof, regardless of the distance the foot engaging surface of the window is disposed from the window sash.

In addition to the foregoing objects, this invention consists of a certain embodiment of elements adapted to be rearranged to function under various conditions established where modified construction of window frames, sashes and panels exist.

Among the aforesaid objects of this invention an association of elements is introduced which permits the window cleaning device to be disposed in operative position against the glass panels of a window sash by wedging the bracket thereof between the opposed foot engaging surfaces of the window frame.

With these and other objects in view, this invention resides in certain novel features of construction, arrangement and combination of elements to be hereinafter more fully set forth in the specification, illustrated in the accompanying drawings and pointed out in the appended claims and, while the disclosure depicts my present conception of the invention, the right is reserved to resort to such changes in construction and arrangement of elements as come within the scope of the claims.

In the accompanying drawings forming a part of this application:

Fig. 1 is an outside view of a window showing the window cleaning device disposed in operative position by full lines and in its initial position for application by dotted lines;

Fig. 2 is an enlarged plan view on line 2—2 of Fig. 1; portions thereof being shown in section;

Fig. 3 is an enlarged front view of the window cleaning device as shown in Fig. 1 with the wiping element thereof removed;

Fig. 4 is a plan view thereof partly in section;

Fig. 5 is an enlarged sectional view approximately on line 5—5 of Fig. 2;

Fig. 6 is a detail perspective view of a portion of the extensible brush, the same being disposed in juxtaposition;

Fig. 7 is a detail perspective view of a portion of the wiping element;

Fig. 8 is a detail sectional view of one of the feet showing the manner of inserting the shoe therein;

Fig. 9 is a face view of one of the feet;

Fig. 10 is a detail perspective view of one of the adjustable end clips having an end wall;

Fig. 11 is a detail perspective view of the clip supporting collar;

Figs. 12 to 16 inclusive show horizontal sectional views through a window frame and sash with one of the feet of the bracket disposed in successive adjusted positions from the window panel and engaging the window frame in various positions;

Fig. 17 is a view similar to Fig. 2, showing a guide rail for the feet of the bracket;

Fig. 18 is a detail perspective view of one of the guide rails;

Fig. 19 is a perspective view of a modified form of bracket, partly in section, showing a bracket adapted to be adjusted to fit unusually wide windows;

Fig. 20 is an enlarged detail sectional view of a portion thereof.

Fig. 21 is a plan view of the window cleaning device showing the brush as associated with a clip having an end wall.

In the present embodiment of this invention the numeral 5 designates, in general, a window cleaning device disposed in a window frame F in operative relation with the glass panels P of the slidable sashes S. While in the present illustration the sashes S are shown as carrying the plain and colonial type panels, the window cleaning device can be disposed to operate over and clean leaded or other types of panels having any configuration.

The window cleaning device 5 preferably consists of a telescopic bracket 6 comprising a male member 7 and female member 8, the latter of which is provided with a series of aligned opposed apertures 9 adapted to register with opposed apertures 10 formed in a lug 11 secured to the extremity of a coil spring 12 having its opposite end attached to the inner extremity of the male element 7 of the telescopic bracket.

With the aforesaid elements assembled, the telescopic bracket can be either extended or contracted and retained in the desired position by passing a suitable fastening element 13, herein shown in the form of a bolt, through certain of the apertures in the female member and those of the lug 11, thus providing means whereby, when the telescopic bracket is contracted by forcing its ends between the opposed sides of window frames, tension on the coil spring will be established and frictional engagement with the window frame will be obtained.

Pivotally secured to the outer ends of the male and female members of the telescopic bracket are feet 14, the same being attached to the members of the bracket through the instrumentality of pins 15 passing through ears 16 formed on the backs of the feet and elongated slots 17 formed in the ends of the members of the brackets.

This structure provides what will be hereinafter termed universal couplings connections between the feet and members of the bracket because the feet are permitted to rock in opposite directions on their pivots and tilt sidewise on plains approximately at right angles to those upon which they rock, thus it will be readily observed that, when the feet on the opposite ends of the members of the bracket contact with surfaces out of true, they will adjust themselves to bear throughout their entire areas. Also this structure enables an individual who is about to wash a window to dispose the bracket, which is previously extended beyond the lateral limitation of the window frame, diagonally across the window, as shown by dotted lines in Figs. 1 and 3, whereupon movement of one end thereof will compress the spring as the telescopic members contract and retain the bracket in rigid position relative to the window frame.

The feet are preferably formed with side walls 18, certain opposite ones of which are provided with inturned ears 19 adapted to retain rubber shoes 20 within the walls of the feet when inserted therebeneath as shown in Fig. 8.

The bearing areas of the rubber shoes 20 are channeled at right angles as at 21 both to establish secure engagement with window frames and to provide for utilizing the same under conditions wherein the bracket must be supported as shown in Figs. 12 to 17, and other positions too numerous to illustrate in this application.

Carried on one member of the telescopic bracket, preferably the female member, are adjustable clips 22 which are retained in rigid relation to the bracket by suitable fastening elements 23, while disposed on the other member of the bracket, preferably the male member which is the smaller in diameter, is a slidable collar 24, the same being adapted to accommodate a clip 22' similar in every respect to clips 22. Through the provision of this structure the bracket can be extended to various limitations and the clips arranged so as to support a brush 24' regardless of the length necessary to extend across a window.

Although a wiper as set forth in my pending application can readily be utilized with the present improved association of elements, I herein provide a wiper 25 secured longitudinally along its edges 26 by separable fasteners 27, which preferably lie inwardly of the tube thus formed when fastened. This wiper is of considerable area and, when a certain area thereof is pressed against the glass panels of a window by the brush, the excessive material is folded between the bracket and window panel on top of the brush, as shown in Fig. 5. This disposition of the wiper permits the brush to constantly feed the excessive material beneath it as the window panel is moved up and down.

With the present arrangement of the clips, the brush is disposed beneath the bracket, but in certain other positions the clips must be disposed so the brush will lie on top of the bracket.

In order to dispose the bracket different distances from the window sash, especially to obtain a rigid grip of the feet against the window frame, the feet have their pivots disposed at points remote from their centers, thus establishing a short side 28 and long side 29 as indicated by Fig. 8. With this arrangement of elements or in fact disposition of the pivotal points of the feet, it will be observed that by simply presenting opposite ends of the feet toward the window sash and rearranging the clips the bracket can be secured at various distances from the sash, whereupon a brush of suitable width, that is one having bristles of proper length, must necessarily be inserted in or supported by the clips to yieldingly press the wiper against the glass panels of a window as aforesaid.

To further establish the security of the bracket in operative position the feet are lodged beneath the window cords C of the sashes as shown in Fig. 2.

Where exceptional rigidity must be maintained between the bracket and window frame, a rail R, as shown in Figs. 17 and 18, is secured to each side of the window frame at proper points to permit the shoes to straddle the same.

In the form shown by Figs. 19 and 20, the bracket 5 consists of a female member 8', having a series of opposed apertures 9' therein, which is adapted to telescopically receive a male member 7' similar in every respect to male member 7 and a companion male member 7'' provided with opposed apertures 10' through which and selected apertures of the female member a fastening element 13' is adapted to be extended and secured, while through the lug 11 of the male member 7' and other of the apertures of the female member 8' the fastening element 13 is secured. Adapted to be associated with this embodiment of elements, for similar purposes as heretofore stated, are clips and shoes similar in every respect to those utilized with the preferred form of my invention. Through the introduction of this embodiment of elements, windows of considerable widths can be cleaned, in addition to those comprising numerous sashes carried side by side in a single frame with a partition therebetween.

While the clips 22 are utilized to support the brush in most instances clips 22', as shown in Fig. 10, are in certain instances utilized in conjunction therewith to abut the ends of the brush and act as gages to obtain positive alignment of the ends of the brush with the vertical puttied edges of the glass panels.

With this invention fully set forth, it is manifest that a window cleaning device of appreciable utility is introduced and, through the provision of the semi-swiveled feet, firm frictional grips will be maintained regardless of the configuration of the surface to support the bracket.

Having thus described my invention, what I claim and desire to protect by Letters Patent is:

1. A window cleaning device adapted to be secured laterally of a window frame, comprising a telescopic bracket, feet disposed at the ends of the bracket, universal couplings connecting the feet to the bracket, a brush, clips connecting the brush to the bracket, a wiper over the brush, and fastening elements carried by the wiper and securing the same around the brush and co-related elements thereof.

2. A window cleaning device of the character set forth comprising a bracket consisting of a male and a female member telescopically associated, said female member being provided with a series of opposed apertures, a coil spring secured at one end to the inner end of the male member, a lug secured to the opposite end of the coil spring and having opposed apertures registering with certain selected apertures in the female member, a fastening element passing through the selected apertures of the female member and those of the lug, adjustable clips carried by the female member, a collar slidably carried by the male member, a clip removably secured to the collar, a brush seated in the clips, and a wiper over the working area of the brush.

3. A window cleaning device of the character set forth comprising a telescopic bracket consisting of a male member having its inner end depressed on certain opposite sides and a female member having opposed apertures, feet having yielding outer surfaces, universal couplings connecting the feet to the ends of the bracket, a coil spring having one extremity passing through the inner end of the male member and seated in the depression thereof, a lug having opposed apertures at one end and other opposed apertures in a depressed portion at its opposite end for the reception of that end of the spring opposite the male member engaging end thereof, a fastening element passing through selected apertures of the female member and certain of those of the lug, clips secured to the male and female members, a brush engaged by the clips, and a wiper over the brush.

4. A window cleaning device of the character set forth comprising male and female bracket sections telescopically associated means yieldingly connecting said sections together, adjustable clips carried by the bracket remote from the ends thereof, other clips adjustably carried by the bracket in the region of its opposite ends, and end walls formed on the last mentioned clips, a brush supported by the clips with its ends abutting the walls of the last mentioned clips, and a wiper enclosing the brush and a certain portion of the bracket.

In testimony whereof I affix my signature.

ELMER E. SHIPLEY.